ized Patent [19]

Weber et al.

[11] Patent Number: 4,777,187
[45] Date of Patent: Oct. 11, 1988

[54] PROCESS FOR THE PRODUCTION OF MOLDED ARTICLES, MIXTURES OF ISOCYANATE REACTIVE COMPOUNDS SUITABLE THEREFOR AND THE MOLDED ARTICLES OBTAINED BY THE PROCESS

[75] Inventors: Christian Weber; Hermann Schäfer, both of Leverkusen, Fed. Rep. of Germany

[73] Assignee: Bayer Aktiengesellshaft, Leverkusen, Fed. Rep. of Germany

[21] Appl. No.: 149,771

[22] Filed: Jan. 29, 1988

[30] Foreign Application Priority Data

Feb. 7, 1987 [DE] Fed. Rep. of Germany ....... 3703739

[51] Int. Cl.$^4$ ............................................. C08G 18/14
[52] U.S. Cl. ...................................... 521/51; 521/124; 521/159; 521/163; 521/174; 524/724; 528/52; 528/53; 528/56; 528/76; 528/77; 252/183.11
[58] Field of Search ................. 521/51, 124, 159, 163, 521/174; 524/724; 528/52, 53, 56, 76, 77; 252/182

[56] References Cited

U.S. PATENT DOCUMENTS

| 4,218,543 | 8/1980 | Weber et al. | 521/51 |
| 4,296,212 | 10/1981 | Ewen et al. | 521/163 |
| 4,324,867 | 4/1982 | Patton, Jr. et al. | 521/159 |
| 4,374,210 | 2/1983 | Ewen et al. | 521/159 |
| 4,540,750 | 9/1985 | Ham | 525/504 |
| 4,569,951 | 2/1986 | Nelson | 521/167 |

FOREIGN PATENT DOCUMENTS 0204246 12/1986 European Pat. Off. .
3147736 6/1983 Fed. Rep. of Germany .

Primary Examiner—Maurice J. Welsh
Attorney, Agent, or Firm—Gene Harsh; Joseph C. Gil; Thomas W. Roy

[57] ABSTRACT

The present invention is directed to a process for the production of polyurethane or polyurea elastomeric molded articles according to the reaction injection molding process by reacting a polyisocyanate, a high molecular weight isocyanate reactive component and optionally a diamine chain extender, wherein the improvement is based on the use of the reaction product of a polyepoxide containing at least two epoxide groups with at least one mol of an aromatic diamine per epoxide group wherein the polyepoxide is present in an amount sufficient to provide about 0.5 to 25% by weight of the polyepoxide based on the weight of all the isocyanate reactive components. The present invention is also directed to the isocyanate reactive components for use in this process and to the molded articles produced in accordance with this process.

21 Claims, No Drawings

PROCESS FOR THE PRODUCTION OF MOLDED ARTICLES, MIXTURES OF ISOCYANATE REACTIVE COMPOUNDS SUITABLE THEREFOR AND THE MOLDED ARTICLES OBTAINED BY THE PROCESS

BACKGROUND OF THE INVENTION

1. Field of the Invention

The present invention relates to an improved one-step process for the production of elastomeric molded articles having a closed surface layer by reaction injection molding of highly reactive systems of polyisocyanates, relatively high molecular weight polyhydroxyl(-polyamino) compounds and polyamines; the mixtures of isocyanate reactive compounds suitable therefor; and the molded articles obtained by the process.

2. Description of the Prior Art

The production of elastomeric molded articles having a closed surface layer by reaction injection molding is known (see e.g. DE-AS No. 2,622,951 (U.S. Pat. No. 4,218,543), EP-A- No. 00 81 701, U.S. Pat. No. 4,296,212, U.S. Pat. No. 4,324,867 or U.S. Pat. No. 4,374,210).

With suitable choice of the starting components it is possible by this process to produce both elastomeric and rigid products and any variations in between.

The resulting molded articles are used, for example, as shoe soles or in particular as car body parts in the automobile industry. Processing of the raw materials is carried out by the reaction injection molding process (RIM process). This is a technique in which highly reactive, liquid starting components are injected within a very short time into a mold by high pressure dosing apparatus with high output after they have been mixed in force controlled mixing heads. It is described, for example, in DE-AS No. 2,622,951 how even extremely reactive systems, i.e. one-shot mixtures of di- or polyisocyanates based on 4,4'-diisocyanato-diphenylmethane which are liquid at room temperature, aromatic polyamines, relatively high molecular weight polyhydroxyl compounds containing primary hydroxyl groups and powerful catalysts can be worked up with cream times of less than one second.

Solidification of the reaction mixture after injection takes place so rapidly that in the case of extremely reactive mixtures the mold can be opened after only 5 seconds to remove the part from the mold.

One-shot mixtures of a polyisocyanate component, aromatic diamines and polyethers containing primary and/or secondary amino groups result in polyurea elastomers when worked up by the RIM process (see e.g. EP-A- No. 0,081,701).

Polyurea elastomers which are to be used as material for car body elements are required to have a high rigidity. By using glycols as co-chain lengthening agents it is possible to increase the flexural strength of the molded parts, but the thermal properties such as the flexural modulus at high and low temperature and the stability under heat (sag) are then adversely altered.

There are also limits to the amount of diamine chain lengthening agent which may be used in a one-shot system. Under normal processing conditions (50°–70° C. mold temperature), the molded parts produced are so brittle that they cannot be removed intact even after a prolonged dwell time in the mold. Thus, for example, in materials prepared from about 23 to 25% by weight of diethyltoluylenediamine (DETDA), an increase in the flexural modulus which is generally from about 350 MPa (when relatively high molecular weight polyhydroxyl compounds are used) to about 550 MPa (when polyethers with aromaticlly bound amino groups are used as relatively high molecular weight reactants for the polyisocyanates), is not possible without the use of fillers. When fillers are included, in particular glass fiber fillers, a flexural modulus of about 1000 to 1500 MPa can be obtained when using similar amounts of DETDA.

The process of DE-OS No. 3,520,326 constitutes a major advantage when compared with the known art process discussed above in that by increasing the mold temperature from the usual range of about 50°–70° C. to at least 105° C. it enables diamine chain lengthening agents to be used at a higher concentration while still enabling the molded articles to be removed from the mold, with the result that a substantial increase in the flexural modulus may be obtained. This process has the disadvantage, however, that it must be carried out at quite uncustomarily high molding temperatures. At these high molding temperatures the internal mold release agents generally used, in particular those based on combinations of zinc carboxylates such as zinc stearate and aliphatic polyamines, to a large extent lose their effect.

It was therefore an object of the present invention to provide an improved process for the production of elastomeric molded articles having a closed surface layer by reaction injection molding using the above-mentioned starting materials, which process combines the following advantages:

The process should enable molded articles to be produced with a flexural modulus distinctly above 400 MPa at room temperature.

The molded articles should be readily removable from the mold (i.e., adequate "green strength").

Internal mold release agents should be able to be used in the process without entirely or partly losing their effect as in the case of high molding temperatures.

This problem was able to be solved by the process according to the invention described below. It was surprisingly found that molded articles satisfying the requirements mentioned above could be produced if the reaction mixture contained certain reaction products of polyepoxides and aromatic diamines described in more detail below.

SUMMARY OF THE INVENTION

The present invention is directed to a process for the production of polyurethane or polyurea elastomeric molded articles having a density of about 0.8 to 1.4 g/cm$^3$ by the reaction, inside closed molds, of a reaction mixture containing (a) a polyisocyanate component containing at least one di- or polyisocyanate containing exclusively aromatically bound isocyanate groups, (b) a mixture of compounds containing isocyanate reactive groups which mixture contains (b1) compounds having a molecular weight of about 1800 to 12,000 and at least at two isocyanate reactive groups and (b2) optionally at least one diamine having a molecular weight of 108 to about 400 and two primary and/or secondary, aromatically bound amino groups, components (a) and b) being processed as a one-shot system by reaction injection molding at an isocyanate index of about 70 to 130 characterized in that component (b) additionally contains (b3) reaction products of
  (i) polyepoxides in the epoxide equivalent range of 76 to about 550 and containing at least two epoxide groups and
  (ii) aromatic diamines of the type mentioned under (b2), at least one mol of diamine (ii) being used per mol of epoxide groups (i) in the preparation of the reaction product, component (b3) being used in a quantity corresponding to a proportion of epoxide compound (i), based on the total weight of component (b), of about 0.5 to 25% by weight.

The present invention is also directed to the products obtained by this process and to mixtures suitable for carrying out this process containing (b) a mixture of compounds containing isocyanate reactive groups, which mixture contains
  (b1) compounds having a molecular weight of about 1800 to 12,000 and at least two isocyanate reactive groups and
  (b2) optionally at least one diamine having a molecular weight of 108 to about 400 and containing two primary and/or secondary aromatically bound amino groups and
  (b3) reaction products of
    (i) polyepoxides in the epoxide equivalent weight range of from 76 to about 550 and containing at least two epoxide groups and
    (ii) at least one aromatic diamine of the type mentioned under (b2),
  at least one mol of diamine (ii) having been used per mol of epoxide groups (i) in the preparation of the reaction product, component (b3) being present in a quantity corresponding to a proportion of epoxide compound (i) of about 0.5 to 25% by weight, based on the total weight of component (b).

In the context of this invention, "molded articles based on polyurethane" are to be understood to be synthetic resin products which contain urea groups as well as urethane groups. The term "molded articles based on polyurea" stands for polyurea synthetic resins which are free from urethane groups.

Starting component (a) to be used according to the invention include any di- or polyisocyanates in which all of the isocyanate groups are aromatically bound. The compounds used as component (a) are preferably di- or polyisocyanates which are based on diisocyanatodiphenylmethane and are liquid at room temperature. These include 1. mixtures, which are liquid at room temperature, of 2,4'- and 4,4'-diisocyanatodiphenylmethane optionally containing small proportions of 2,2'-diisocyanatodiphenylmethane;
2. polyisocyanate mixtures of the diphenylmethane series which are liquid at room temperature and obtained in known manner by the phosgenation of aniline/formaldehyde condensates and containing, in addition to diisocyanates of the type mentioned under 1, up to about 30% by weight, preferably up to about 10% by weight, of higher homologues of these diisocyanates;
3. urethane group-containing polyisocyanates which are liquid at room temperature and obtained by the reaction of the di- and polyisocyanates mentioned under 1 and 2 or 4,4'-diisocyanatodiphenylmethane, which is solid at room temperature, with sub-equivalent quantities of low molecular weight diols or triols, preferably polypropylene glycols having a maximum molecular weight of 700, in particular the reaction product of one mol of 4,4'-diisocyanatodiphenylmethane with about 0.05 to 0.3 mol of di- and/or tripropylene glycol;
4. modification products of the di- and polyisocyanates mentioned under 1 and 2 or 4,4'-diisocyanatodiphenylmethane which are liquid at room temperature and contain carbodiimide and/or uretoneimine groups or
5. isocyanate semi-prepolymers which are liquid at room temperature and obtained by the reaction of the di- and polyisocyanates mentioned under 1 and 2 or 4,4'-diisocyanatodiphenylmethane with subequivalent quantities of organic polyhydroxyl compounds at an equivalent ratio of isocyanate groups to hydroxyl groups of about 1:0.01 to 1:0.5, preferably about 1:0.015 to 1:0.25, the polyhydroxyl compounds used being, for example, those of the type optionally present in component (b1). The preparation of such isocyanate semi-prepolymers is described, for example, in U.S. Pat. No. 4,374,210.

The particularly preferred polyisocyanates to be used in the process according to the invention include the reaction products obtained according to DE-PS No. 1,618,380 of 1 mol of 4,4'-diisocyanatodiphenylmethane with about 0.05 to 0.3 mol of polypropylene glycols having a maximum molecular weight of 700, preferably di- and/or tripropylene glycol, as well as the diisocyanates based on 4,4'-diisocyanatodiphenylmethane and optionally 2,4'-diisocyanatodiphenylmethane which contain carbodiimide groups and/or uretoneimine groups and are liquid at room temperature. These may be obtained, for example, according to DE-PS 1,092,007, DE-OS No. 2,537,685, U.S. Pat. Nos. 3,384,653, 3,449,256, 4,154,752 or EP-A- No. 0,057,862. Mixtures of the polyisocyanates mentioned as examples may also be used as component (a).

Starting component (b) to be used according to the invention is based on mixtures of the individual components (b1) and optionally (b2) with component (b3) which is an essential component of the invention.

Component (b1) is based on organic compounds with a molecular weight of about 1800 to 12,000 and containing at least two isocyanate reactive groups. They are preferably polyalkylene polyethers in the aforesaid molecular weight range, in particular in the molecular weight range of about 3000 to 7000, containing hydroxyl and/or amino groups as isocyanate reactive groups. When polyether mixtures are used, individual components of the mixture may have a molecular weight below 1800, for example about 500 to 1800, provided the average molecular weight of the mixture lies within the last mentioned ranges. The use of such mixtures in which individual components have a molecular weight below 1800 is, however, less preferred.

The polyethers with at least two, preferably two to three hydroxyl groups are known and may be prepared, for example, by the polymerization of epoxides such as ethylene oxide, propylene oxide, butylene oxide, tetrahydrofuran, styrene oxide or epichlorohydrin, either on their own, e.g. in the presence of $BF_3$, or by addition of these epoxides, optionally as mixtures or successively, to starting components containing reactive hydrogen atoms such as water, alcohols, ammonia or amines. Examples include ethylene glycol, propylene glycol- (1,3) or -(1,2), trimethylolpropane, 4,4'-di-hydroxydiphenylpropane, aniline, ethanolamine or ethylene diamine. Sucrose polyethers such as those described, for example, in German Auslegeschriften Nos. 1,176,358 and 1,064,938 may also be used for the purpose of this invention. In many cases it is preferred to use polyethers which contain at least about 50%, preferably at least about 90% primary hydroxyl groups, based on all of the OH groups present in the polyether. Polyethers which have been modified with vinyl polymers, e.g. by the polymerization of styrene and acrylonitrile in the presence of polyethers (U.S. Pat. Nos. 3,383,351, 3,504,273, 3,523,093 and 3,110,695) and German Patent No. 1,152,536 are also suitable as well as polybutadienes containing OH groups. Also to be included among the preferred polyhydroxy polyethers are the alkoxylation products of the di- and/or trifunctional starter molecules exemplified above with ethylene oxide and/or propylene oxide, which alkoxides may be used as mixtures or in any sequence. Pure polyethylene oxide polyethers are less preferred. The preferred polyether polyols containing predominantly primary hydroxyl groups are obtained by grafting ethylene oxide onto the end of the chain.

In the polyethers used according to the invention, at least about 50 equivalent percent, preferably about 80-100 equivalent percent, of the terminal isocyanate reactive groups may be primary and/or secondary aromatically or aliphatically, preferably aromatically bound amino groups, while the remainder are primary and/or secondary, aliphatically bound hydroxyl groups. In these compounds, the terminal groups containing the amino groups may be linked to the polyether chain by urethane or ester groups. These "aminopolyethers" are prepared in known manner, for example by amination of polyhydroxypolyethers such as polypropylene glycol ethers with ammonia in the presence of Raney nickel and hydrogen (BE-PS- No. 634,741). U.S. Pat. No. 3,654,370 describes the preparation of polyoxyalkylene polyamines by the reaction of the corresponding polyol with ammonia and hydrogen in the presence of a nickel, copper or chromium catalyst. DE-PS No. 1,193,671 describes the preparation of polyethers containing amino end groups by hydrogenation of cyanoethylated polyoxypropylene ethers. Other methods for the preparation of polyoxyalkylene-(polyether)-amines are described in U.S. Pat. Nos. 3,155,728, 3,326,895 and FR-PS No. 1,551,605. FR-PS No. 1,466,708 describes the preparation of polyethers containing secondary amino end groups.

Relatively high molecular weight polyhydroxyl polyethers may also be converted into the corresponding anthranilic acid esters by a reaction with isatoic acid anhydride as described, for example, in DE-OS No. 2,019,432, DE-OS No. 2,619,840, U.S. Pat. Nos. 3,808,250, 3,975,428 or 4,016,143. This reaction results in polyethers containing terminal aromatic amino groups.

According to DE-OS No. 2,546,536 and U.S. Pat. No. 3,865,791, relatively high molecular weight compounds containing terminal amino groups are obtained by the reaction of isocyanate prepolymers based on polyhydroxypolyethers with hydroxyl-containing enamines, aldimines or ketimines followed by hydrolysis.

It is preferred to use amino polyethers which have been obtained according to DE-OS No. 2,948,419 or U.S. Pat. No. 4,515,923 herein incorporated by reference in its entirety, by the hydrolysis of compounds containing terminal isocyanate groups. This process is preferably carried out by reacting polyethers containing two or three hydroxyl groups with polyisocyanates to form isocyanate prepolymers and then converting the isocyanate groups into amino groups in a second stage of the process by hydrolysis.

The "amino polyethers" which may be used as component (b1) according to the invention are in many cases mixtures of the compounds exemplified above and contain a statistical average of 2 to 3 terminal isocyanate reactive groups.

In the process according to the invention, the "amino-polyethers" exemplified above may be used as mixtures with polyhydroxypolyethers which are free from amino groups, such as those mentioned in U.S. Pat. No. 4,218,543, although this is less preferred.

A certain proportion of hydroxyl-containing polyesters, polythioethers, polyacetals, polycarbonates or polyester amides of the kind commonly used for the production of both homogeneous and cellular polyurethanes may also be used according to the invention.

Polyhydroxyl or polyamino compounds containing high molecular weight polyadducts or polycondensates in a finely dispersed or dissolved form may also be used according to the invention.

Any mixtures of the compounds exemplified above containing isocyanate reactive groups may, of course, be used as starting component (b1).

Component (b2) is based on diamines having a molecular weight of 108 to about 400 and containing two primary and/or secondary aromatically bound amino groups. It is preferred to use aromatic diamines in this molecular weight range which have an alkyl substituent such as halogen, ester, ether or disulphide groups as is the case, for example, with methylene-bis-chloroaniline.

It is particularly preferred to use diamines which have at least one alkyl substituent with 1 to 4, preferably 1 to 3 carbon atoms in the ortho-position to the first amino group and two alkyl substituents with 1 to 4, preferably 1 to 3 carbon atoms in the ortho-position to the second amino group. Most preferred are those diamines which have an ethyl, n-propyl and/or isopropyl substituent in at least one ortho-position to the amino groups and optionally methyl substituents in other ortho-positions to the amino groups.

The following are examples of preferred or particularly preferred diamines: 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane or 3,5-diethyl-3',5'-diisopropyl-4,4'-diaminodiphenylmethane, 1,3-diamino-2-t-butyl-4,6-dimethylbenzene, 1,3-diamino-2,4-dimethyl-6-t-butyl-benzene and mixtures of these two isomers. 1-methyl-3,5-diethyl-2,4-diaminobenzene and commercial mixtures thereof which are liquid at room temperature and preferably contain up to about 35% by weight of 1-methyl-3,5-diethyl-2,6-diaminobenzene (DETDA), based on the mixture, are particularly preferred. The alkyl substituted aromatic diamines mentioned as examples in U.S. Pat. No. 4,324,867 and in EP-A- No. 0,069,286 are also suitable. Component (b) may, of course, be based on any mixtures of the alkyl substituted aromatic diamines exemplified above.

Component (b3) which is essential to the invention is based on reaction products of (i) at least one polyepoxide containing at least 2, preferably 2 to 4 and more preferably 2 to 3 epoxide groups per molecule and having an epoxide equivalent weight of 76 to about 550, preferably about 100 to 250, with (ii) diamines or diamine mixtures of the type exemplified under (b2).

The polyepoxides (i) may be any aliphatic, cycloaliphatic, aromatic or heterocyclic compounds containing at least two 1,2-epoxide groups or mixtures of such compounds. Examples include: polyglycidyl ethers of polyvalent phenols such as of pyrocatechol, resorcinol, hydroquinone, 4,4'-dihydroxydiphenylmethane, 4,4'-dihydroxy-3,3'-dimethyldiphenylmethane, 4,4'-dihydroxydiphenylmethane, 4,4'-dihydroxy-3,3'-dimethyldiphenylpropane, 4,4'-dihydroxydiphenyl, 4,4'-dihydroxydiphenylsulphone-3,3'dimethyldiphenylpropane, 4,4'-dihydroxydiphenyl, 4,4'-dihydroxydiphenylsulphone and tris-(4-hydroxy- phenyl)-methane; the chlorination and bromination products of the above-mentioned diphenols, as well as polyglycidyl ethers of Novolaks (i.e. reaction products of monovalent or higher valent phenols with aldehydes, in particular formaldehyde, obtained by the esterification of 2 mol of the sodium salt of an aromatic hydroxycarboxylic acid with 1 mol of a dihalogenalkane or dihalogendialkylether (see British Pat. No. 1,017,612); and polyphenols obtained by the condensation of phenols with long chained halogenated paraffins containing at least two halogen atoms (see GB-PS No. 1,024,288). The following should also be mentioned: polyepoxide compounds based on aromatic amines and epichlorohydrin, e.g. N-di-(2,3-epoxypropyl)-aniline, N,N'-dimethyl-N,N'-diepoxypropyl 4,4'-diaminodiphenylmethane or N-diepoxypropyl-4-amino-phenylglycidylether (see GB-PS Nos. 772,830 and 816,923).

The following may also be used: glycidyl esters of polybasic aromatic, aliphatic and cycloaliphatic carboxylic acids, e.g. phthalic acid diglycidyl esters, adipic acid diglycidyl esters and glycidyl esters of reaction products of 1 mol of an aromatic or cycloaliphatic dicarboxylic acid anhydrides with ½ mol of a diol or 1/n mol of a polyol containing n hydroxyl groups, or hexahydrophthalic acid diglycidyl esters optionally substituted with methyl groups.

Glycidyl ethers of polyhydric alcohols such as 1,4-butanediol, glycerol, trimethylolpropane, pentaerythritol and polyethylene glycols may also be used. Triglycidyl isocyanurate, N,N'-diepoxypropyl-oxamide, polyglycidylthioethers of polyvalent thiols, e.g. bis-mercaptomethylbenzene, diglycidyltrimethylene trisulphone and polyglycidylethers based on hydantoins may also be used.

Also suitable are the epoxidation products of polyunsaturated compounds such as vegetable oils or their conversion products, epoxidation products of di- and polyolefins such as butadiene, vinyl cyclohexane, 1,5-cyclooctadiene and 1,5,9-cyclododecatriene and polymers and copolymers still containing epoxidizable double bonds, e.g. those based on polybutadiene, polyisoprene, butadiene-styrene copolymers, divinyl-benzene, dicyclopentadiene and unsaturated polyesters, epoxidation products of olefins obtainable by Diels-Alder addition and subsequently converted into polyepoxides by epoxidation with peroxy-compounds, as well as the epoxidation products of compounds containing two cyclopentene or cyclohexene rings linked through bridging atoms or groups. Polymers of unsaturated monoepoxides may also be used, e.g. the polymers of methacrylic acid glycidyl esters or allyl glycidyl ethers.

For the purpose of the invention, it is preferred to use polyepoxides which have at least one aromatic or cycloaliphatic ring. These include polyglycidyl ethers of polyvalent phenols, in particular of bisphenol A; polyepoxide compounds based on aromatic amines, in particular N,N-bis-(epoxypropyl)-aniline, N,N'-dimethyl-N,N'-bis-(epoxypropyl)-4,4'-diaminodiphenylmethane and N,N-bis-(epoxypropyl)-4-aminophenylglycidyl ether; polyglycidyl esters of cycloaliphatic dicarboxylic acids, in particular of hexahydrophthalic acid diglycidyl ester, and polyepoxides of the reaction product of n mols of hexahydrophthalic acid anhydride with 1 mol of a polyol containing n hydroxyl groups (n=integer from 2 to 6), in particular the reaction product of 3 mol of hexahydrophthalic acid anhydride with 1 mol of 1,1,1-trimethylolpropane; and 3,4-epoxy-cyclohexylmethane-3,4-epoxycyclohexane-carboxylate.

Particularly preferred polyepoxides are those which have at least one aromatic ring in the molecule, such as the diglycidyl ether of bisphenol A and commercial mixtures thereof with its higher homologues or N,N-bis-(epoxypropyl)-aniline.

Liquid polyepoxides or low viscosity diepoxides such as bis-(N-epoxypropyl) aniline or vinyl cyclohexane diepoxide may in certain cases lower the viscosity of polyepoxides which are already liquid or convert solid polyepoxides into liquid mixtures.

For the preparation of the reaction products (b3), the individual components (i) and (ii) are used in the quantities required to provide at least one mol of component (ii) for each epoxide group of component (i). A large excess of diamine may, of course, be used. In that case, a mixture of the individual components (b2) and (b3) which is to be mixed with component (b1) may be prepared in situ since a diamine excess used for the preparation of component (b3) automatically provides a mixture of reaction products (b3) and diamines (b2).

It is only when a comparatively small excess of diamine is used or when only 1 mol of diamine is used for each epoxide group in the preparation of component (b3) that a further quantity of diamines (b2) may subsequently be added for the preparation of mixture (b) if mixture (b) is required to contain such free diamines (b2).

The reaction product (b3) is generally prepared at a temperature of about 50° to 180° C., preferably about 80° to 150° C., with stirring of the reaction mixture formed from the starting components (i) and (ii). The end of the reaction can be detected by the decrease in reaction temperature.

The diamine (ii) used for the preparation of component (b3) need not be identical to component (b2) although the same diamines of the type mentioned above are generally used both as component (b2) and as component (ii).

The total quantity of diamines present as free diamines in component (b2) and chemically bound in component (b3) is generally about 5 to 50% by weight, preferably about 8 to 35% by weight and more preferably about 20 to 35% by weight, based on the total weight of component (b). The quantity of reaction product (b3) generally corresponds to a proportion of the epoxide compound (i) of about 0.5 to 25% by weight, preferably about 3 to 20% by weight, based on the total weight of component (b). Mixture (b) preferably contains up to about 45% by weight, preferably about 5 to 25% by weight, based on the total weight of component (b), of diamines (b2) in addition to the chemically bound diamines present in component (b3). These diamines (b2) may result entirely from the diamine excess used in the preparation of component (b3), as already mentioned. Alternatively, mixture (b) used in the process according to the invention may be based entirely on individual components (b1) and (b3) without any diamines (b2), but this is less preferred.

Reaction product (b3) contains both free amino groups and secondary hydroxyl groups. These reaction products are generally liquids or low melting resins which may be obtained as solutions in the diamine (ii) which has been used in excess and may be mixed with other constituents of component (b) to form clear, monophasic mixtures. The preferred reaction products (b3) generally have a molecular weight (average) of about 450 to 2000. The reaction products (b3) are generally mixtures of isomers (use of isomeric diamine mixtures) and/or of homologues (higher homologues are formed, for example, when epoxide resins containing a certain proportion of higher homologues are used and/or when a certain amount of chain lengthening takes place during the preparation of reaction products (b3). The (average) molecular weight of the reaction products (b3) may be determined, for example, by gel chromatography.

The auxiliary agents and additives (c) optionally used according to the invention include the known internal mold release agents (c1) used in the art. Suitable internal mold release agents are described, for example, in DE-OS No. 1,953,637, DE-OS No. 2,122,670, DE-OS No. 2,431,968 and DE-OS No. 2,404,310. These include in particular the fatty acid salts containing at least 25 aliphatic carbon atoms and obtained from fatty acids containing at least 12 aliphatic carbon atoms and primary mono-, di- or polyamines containing two or more carbon atoms or amines containing amide or ester groups and having at least one primary, secondary or tertiary amino groups; saturated and/or unsaturated esters containing COOH and/or OH groups and obtained from monofunctional and/or polyfunctional carboxylic acids and polyfunctional alcohols having OH numbers or acid numbers of at least 5; ester type reaction products of ricinoleic acid and long chain fatty acids; salts of carboxylic acids and tertiary amines; and natural and/or synthetic oils, fats or waxes. Condensation products containing ester groups and obtained from ricinoleic acid and monohydric or higher hydric alcohols and having acid numbers below 5 are also suitable, e.g. those described in DE-OS No. 3,436,163. Further examples of suitable internal mold release agents include the reaction products of fatty acid esters with polyisocyanates (DE-OS No. 2,319,648); reaction products of polysiloxanes containing reactive hydrogen atoms with mono- and/or polyisocyanates (DE-OS No. 2,363,452); esters of polysiloxanes containing hydroxymethyl groups with mono- and/or polycarboxylic acids (DE-OS No. 2,363,452); and salts of polysiloxanes containing amino groups and fatty acids (DE-OS Nos. 2,427,273 and 2,445,648).

Particularly preferred internal mold release agents are the zinc salts of aliphatic monocarboxylic acids containing 8 to 24, preferably 12 to 18 carbon atoms, in combination with aliphatic polyamines containing primary or secondary and/or tertiary amino groups to render the zinc salts soluble. Mold release compositions of this type are described, for example, in U.S. Pat. No. 4,581,386, GB-A- No. 2,144,136 and German Patent Application Nos. P 36 26 673.6 and P 36 39 502.1.

Mixtures of the internal mold release agents exemplified above may in principle be used. The internal mold release agents are generally used in quantities of up to about 15% by weight, based on the weight of component (b). When the last mentioned, preferred internal mold release agents based on zinc carboxylates are used, they are generally added in quantities corresponding to a proportion of zinc salts of about 0.5 to 10% by weight, based on the weight of component (b).

The optionally used auxiliary agents and additives (c) also include (c2) catalysts without which molded product cannot generally be obtained with technically interesting mechanical properties within a short dwell time in the mold if the major part of component (b1) is based on compounds containing hydroxyl groups. If, on the other hand, the isocyanate reactive groups in the compounds of component (b1) are based entirely or predominantly on amino groups then the addition of such catalysts is frequently unnecessary.

Preferred catalysts include organic tin compounds, e.g. tin(II) salts of carboxylic acids such as tin(II) acetate, tin(II) octoate, tin(II) ethylhexoate and tin(II) laureate; and the dialkyl tin salts of carboxylic acids such as dibutyl tin diacetate, dimethyl tin dilaurate, dibutyl tin dilaurate, dibutyl tin maleate or dioctyl tin diacetate.

Tertiary amines may also be used as catalysts, e.g., triethylamine, tributylamine, N-methylmorpholine, N-ethylmorpholine, N-cocomorpholine, N,N,N',N'-tetramethyl-ethylenediamine, 1,4-diazobicyclo-(2,2,2)-octane, N-methyl-N'-dimethylaminoethylpiperazine, N,N-dimethylbenzylamine, bis-(N,N-diethylaminoethyl)-adipate, N,N-diethyl-benzylamine, pentamethyldiethylenetriamine, N,N-dimethyl-cyclohexylamine, N,N,N',N'-tetramethyl-1,3-butanediamine, 1,2-dimethylimidazole and 2-methylimidazole and 2-methylimidazole. 1,4-diazabicyclo(2,2,2)-octane is a preferred catalyst of this type.

When the starting components (b1) include compounds containing hydroxyl groups, the tin catalysts exemplified above are preferably used, either alone or together with the amine catalysts mentioned. As already indicated, the use of catalysts may frequently be dispensed with if the isocyanate reactive groups in the compounds of component (b1) are based entirely or predominantly on amino groups. On the other hand, the amine catalysts exemplified above may be used as the only catalysts in such cases.

Other representatives of catalysts to be used according to the invention and details concerning the mode of action of the catalysts are described in Kunststoff-Handbuch, Volume VII, published by Vieweg and Hochtlen, Carl-Hanser-Verlag, Munich 1966, e.g. on pages 96 to 102.

When catalysts are used, they are added in quantities of about 0.001 to 10% by weight, preferably about 0.05 to 1% by weight, based on the quantity of component (b).

Other optionally used auxiliary agents and additives (c) include (c3) blowing agents which are used when the molded products are required to have a compact surface and a cellular core. The term "cellular core" does not, of course, denote true foams but only microcellular structures since molded bodies with a true foam structure would have a density of less than 0.8 g/cm$^3$. Examples of suitable blowing agents include chemical blowing agents such as water whose blowing action is based on the release of carbon dioxide and/or physical blowing agents which are readily volatile organic substances and/or dissolved inert gases. The readily volatile organic substances include compounds which are inert in isocyanate addition reactions, e.g. acetone, ethyl acetate, halogen substituted alkanes such as methylene chloride, chloroform, ethylidene chloride, vinylidene chloride, monofluorotrichloromethane, chlorodifluoromethane, dichlorodifluoromethane, butane, hexane, heptane and diethylethers. Suitable inert gases include nitrogen, air and carbon dioxide.

The action of a blowing agent may also be obtained by the addition of compounds which decompose at elevated temperatures to release gases such as nitrogen. Examples of such compounds include azo compounds such as azo isobutyric acid nitrile. Other examples of blowing agents and details concerning the use of "blowing agents" are described in Kunststoff Handbuch, Volume VII, published by Vieweg and Hochtlen, Carl-Hanser-Verlag, Munich 1966, e.g. on pages 108 and 109, 453 to 455 and 507 to 510.

The optionally used auxiliary agents and additives (c) also include (c4) surface-active additives (emulsifiers and foam stabilizers). Suitable emulsifiers include the sodium salts of ricinoleic sulphates or of fatty acids or salts of fatty acids with amines such as oleic acid diethylamine or stearic acid diethanolamine.

Alkali metal and ammonium salt of sulphonic acids such as dodecylbenzene sulphonic acid or di-naphthylmethane disulphonic acid or fatty acids such as ricinoleic acid or polymeric fatty acids may also be used as surface active additives.

The foam stabilizers used are mainly water-soluble polyether siloxanes. These compounds generally have a copolymer of ethylene oxide and propylene oxide attached to a polydimethylsiloxane group. Foam stabilizers of this kind are described, for example, in U.S. Pat. No. 2,764,565.

The optional auxiliary agents and additives (c) may also include (c5) low molecular weight polyhydric alcohols which may be added with the aminic chain lengthening agents of component (b) to modify the properties of the molded products in quantities of up to about 50 equivalent percent, based on the isocyanate reactive groups in the diamines of component (b). These alcohols include ethylene glycol, butane-1,4-diol, hexamethylene glycol, trimethylolpropane and mixtures thereof as well as low molecular weight addition products (MW<500) obtained by the addition of alkylene oxides, in particular of propylene oxide, to polyhydric alcohols or to polyvalent amines such as ethylene diamine or diethylene triamine.

Other auxiliary agents and additives (c) advantageously used in a preferred embodiment of the process according to the invention are (c6) fillers which are inert towards isocyanate groups. These may be fibrous fillers with an average length of about 0.01 to 10 mm, preferably about 0.05 to 5.0 mm; an average diameter of about 2 to 50 $\mu$m, preferably about 5 to 30 $\mu$m; and a ratio of average length to average diameter in the range of about 5000:1 to 5:1, preferably about 100:1 to 5:1; or platelet shaped fillers (i.e. in the form of scales) having an average diameter of about 0.1 to 5 mm, preferably about 0.3 to 3.5 mm; an average thickness of 0.01 to 1 mm, preferably about 0.05 to 0.2 mm; and a ratio of average diameter to average thickness in the range of about 5:1 to 500:1, preferably about 25:1 to 200:1. It is also possible in principle, although not preferred, to use both fibrous and platelet shaped fillers. The total quantity of fillers (c6) may be up to about 100% by weight, preferably up to about 50% by weight, based on the weight of component (b).

Examples of fibrous fillers include in particular glass fibers in a cut or ground form which may have been treated with suitable bonding agents or sizes and asbestos, serpentine, carbon, aramide, chrysotile and iron oxide (needle-shaped iron oxide) fibers. Examples of fillers in the form of scales include those based on laminated silicates, talc, mica, phlogopite or flake glass.

Known types of granular fillers could also be used in the process according to the invention, e.g., those based on calcspar, heavy spark, kaolin, chalk, silicas, carbon black, titanium dioxide, pyrogenic silicas, micro-glass beads, metal powders, corundum, powdered slate, expanded clay or zinc oxide. These fillers, however, are less preferred than the fibers and platelet shaped fillers.

Molded products with an even higher flexural modulus can be obtained especially when using glass fibers of the type mentioned above.

The optional auxiliary agents and additives (c) are generally incorporated into component (b) when used in the process according to the invention.

The starting components are generally put into the process according to the invention in the quantities required to produce a reactive mixture having an isocyanate index of about 70 to 130, preferably about 90 to 110. By "isocyanate index" is meant the quotient of the number of isocyanate groups and the number of isocyanate reactive groups multiplied by 100. The process according to the invention is carried out by reaction injection molding (RIM process). The quantity of mixture introduced into the mold, which may be a foamable mixture, is calculated to provide molded products having a density of about 0.8 to 1.4 g/cm$^3$ preferably about 0.9 to 1.2 g/cm$^3$. Densities above about 1.2 g/cm$^3$ may occur in the process according to the invention especially when additives with a high specific gravity are used. The equipment and apparatus used for the process according to the invention are those known from the technology of reaction injection molding. The molds used are closed metal molds whose internal walls may be coated with so-called external mold release agents, for example, those based on waxes, soaps or silicone.

A temperature of about 10° to 70° C., preferably about 30° to 50° C. is used as starting temperature for the mixture introduced into the mold.

The temperature of the mold, i.e., the temperature of the internal wall of the mold before the reaction mixture is introduced, is generally in the region of about 40° to 100° C., preferably about 50° to 70° C.

The molded products may generally be removed from the mold after a dwell time of about 5 to 90 seconds, preferably about 20 to 60 seconds.

The molded products obtained by the process according to the invention are suitable in particular for the manufacture of flexible automobile bumpers or car body elements. Other products, e.g., flexible shoe soles with high abrasion resistance and excellent mechanical strength, may be obtained by suitable variation of the starting compounds, in particular by using a relatively small proportion of diamine (b2).

The invention is further illustrated but is not intended to be limited by the following examples in which all parts and percentages are by weight unless otherwise specified.

EXAMPLES

EXAMPLE 1

(Preparation of reaction product (b3))

15 kg of DETDA (mixture of 65% by weight of 1-methyl-3,5-diethyl-phenylenediamine-(2,4) and 35% by weight of 1-methyl-3,5-diethyl-phenylenediamine-(2,6)) and 5 kg of an epoxide resin which is liquid at room temperature (diglycidylether of bisphenol A, epoxide equivalent weight of about 190) were mixed together and heated to 110° C. within 30 minutes with continuous stirring. The temperature of the reaction mixture remained at 110° to 115° C. for about one hour without further supply of heat. After a further 2 hours, the temperature had fallen to about 70° C. The reaction product obtained was clear and had a viscosity of 2400 mPas at 55° C. The reaction product consisted mainly of a solution of 10 kg of the reaction product of DETDA and epoxide resin in 10 kg of excess DETDA. The main component of the reaction product containing hydroxyl and amino groups probably corresponded to the formula

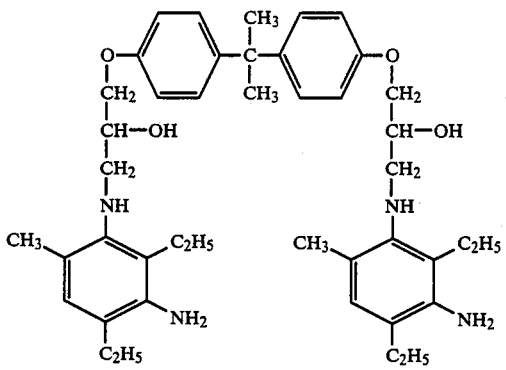

although it may have contained isomers (e.g. reaction products of the 2,6-diamine) and higher homologs (reaction products of small quantities of oligomers present in the epoxide resin) in addition to the compound corresponding to the above formula.

Examples 2 to 4

(general method of preparation)

The formulations described in Examples 2 to 40 below were worked up by reaction injection molding (RIM). In this process, the polyol mixture and polyisocyanate were introduced into a high pressure apparatus and after intensive mixing in a force controlled mixing head the resulting mixture was rapidly forced into a metal mold. The temperature of the metal mold (aluminum plate mold measuring 30×20×0.4 cm) was 65° C. The temperature of the raw materials is adjusted to 45° C. and the dwell time in the mold was 30 sec. The metal mold was treated with a commercial mold release agent (RCTW 2006, manufacturers: Chem-Trend Inc. 3205, Grand River Howell, Mich. 48643/USA).

EXAMPLE 2

71.14 parts by weight of a polyether with an OH number of 28 obtained by the addition, first of propylene oxide and then of ethylene oxide, to trimethylolpropane (ratio by weight: PO:EO=83:17), 28.46 parts by weight of the reaction product from Example 1, 0.30 parts by weight of 1,4-diazabicyclo-(2,2,2)-octane as a 33% solution (Dabco 33LV, Air Products) and 0.10 parts by weight of dimethyl tin dilaurate were combined to form a clear polyol component which was worked up by the RIM process with 62.3 parts by weight of a reaction product of tripropylene glycol and 4,4'-diphenylmethane diisocyanate (23% by weight NCO). The molded product obtained was tempered at 120° C. for 45 minutes. The following mechanical values were then determined on the test plate:

| | |
|---|---|
| Gross density (DIN 53 420) | 1119 kg/m³ |
| Tensile strength (DIN 53 504) | 33.4 MPa |
| Elongation at break (DIN 53 504) | 149% |
| Tear propagation resistance without incision (DIN 53 515) | 43.8 kN/m |
| Shore D (DIN 53 505) | 62 |
| G' - modulus (DIN 53 445) | |
| 100° C. | 68 MPa |
| 65° C. | 99 MPa |
| 20° C. | 172 MPa |
| −30° C. | 431 MPa |
| Flexural modulus RT | 433 MPa |
| (ASTM-D 790-71) 120° C. | 156 MPa |
| sag test (1 h/160° C.) 100 mm overhang | 23.3 mm |

EXAMPLE 3

62.31 parts by weight of a polyether with an OH number of 28 obtained by the addition, first, of propylene oxide and then of ethylene oxide to trimethylolpropane (ratio by weight PO:EO=83:17), 24.90 parts by weight of the reaction product from Example 1, 6.74 parts by weight of a mixture of 65 parts by weight of 1-methyl-3,5-diethyl-phenylenediamine-(2,4) and 35 parts of 1-methyl-3,5-diethyl-phenylenediamine-(2,6), 0.26 parts by weight of 1,4-diazabicyclo-(2,2,2)-octane as a 33% solution (Dabco 33LV, Air Products), 0.18 parts by weight of dimethyl tin dilaurate, 2.00 parts by weight of an ester of 7 mol of ricinoleic acid and 1 mol of hexane 1,6-diol (acid number about 2.0, hydroxyl number about 35) and 3.60 parts by weight of a solution of 1.8 parts by weight of zinc stearate (Haro Chem ZGD, Manufacturer: Haagen Chemie b. V. 6040 AA Roermond (Holland)) in 1.8 parts by weight of a mixture of 50% by weight of bis-(3-dimethylaminopropyl)-amine and 50% by weight of an amine-started poly(oxyalkylene)-polyether tetrol having an OH number of about 630 obtained by the addition of about 5 mol of propylene oxide to 1 mol of ethylene diamine were combined to form a clear polyol component and worked up by the RIM process with 73.0 parts by weight of a reaction product of tripropylene glycol and 4,4'-diphenylmethane diisocyanate (23% by weight NCO).

The molded product obtained was tempered at 120° C. for 45 minutes. The following mechanical values were then determined on the test plate:

| | |
|---|---|
| Gross density (DIN 53 420) | 1133 kg/m³ |
| Tensile strength (DIN 53 504) | 39.3 MPa |
| Elongation at break (DIN 53 504) | 139% |

| | |
|---|---|
| Tear propagation resistance without incision (DIN 53 515) | 24.8 kN/m |
| Shore D (DIN 53 505) | 68 |
| G' modulus (DIN 53 445) | |

| | |
|---|---|
| 100° C. | 103 MPa |
| 65° C. | 145 MPa |
| 20° C. | 239 MPa |
| −30° C. | 513 MPa |
| Flexural modulus RT | 670 MPa |
| (ASTM-D 790-71) 120° C. | 252 MPa |
| Sag test (1 h/160° C.) 100 mm overhang | 10 mm |

The same formulation was used to test the ease of release from the mold.

The mold, which was made of tool steel and in the form of a bowl, was designed to produce a molded part having the following dimensions:

| | |
|---|---|
| External diameter of base | 178 mm |
| External diameter of rim | 186 mm |
| Wall thickness | 4 mm |
| Height of molded part | 68 mm |
| Conicity | 3.50° |

Gate: fountain gate centrally at the base ($\phi = 10$ mm)

For removal of the bowls from the mold it was necessary to overcome powerful shearing forces on the surfaces of the walls. The forces required for tearing open the mold were determined by means of a force transducer with elongation measuring strips as measuring element (Hottinger Baldwin Messtechnik GmbH, D-6100 Darmstadt 1).

The temperature of the raw materials was 45° C. and the temperature of the mold was 65° C. The dwell time in the mold was adjusted to 20 sec and the cycle time was to 60 sec.

The surface of the mold was treated with the commercial mold release agent mentioned in the general method of preparation before the first molded part was produced.

The experimental series was stopped after 50 reaction cycles (production of 50 bowls without further pretreatment of the surface of the mold). To remove the first product from the mold required an opening force of 4.0 kN, while removal of the last product required an opening force of 6.3 kN.

EXAMPLE 4

100 parts by weight of the polyol component from Example 3 were mixed with 43.3 parts by weight of commercial glass fibers (MF 7901, Manufacturer: Bayer AG, 5090 Leverkusen). 100 parts by weight of this polyol/glass fiber mixture were worked up with 51 parts by weight of a reaction product of tripropylene glycol and 4,4′-diphenylmethanediisocyanate (23% by weight NCO).

A steel plate mold measuring 38×20×0.4 cm was tempered at 65° C. The temperature of the raw materials was 45° C. and the dwell time in the mold was adjusted to 30 sec.

The molded product obtained was tempered at 120° C. for 45 minutes. The following mechanical values were then determined on the test plate:

| | |
|---|---|
| Gross density (DIN 53 420) | 1285 kg/m³ |
| Tensile strength (DIN 53 504) | 32.8 MPa |
| Elongation at break (DIN 53 504) | 37% |
| Tear propagation resistance without incision (DIN 53 515) | 63.4 kN/m |
| Shore D (DIN 53 505) | 73 |

| | |
|---|---|
| G′ - modulus (DIN 53 445) | |
| 100° C. | 176 MPa |
| 65° C. | 223 MPa |
| 20° C. | 353 MPa |
| −30° C. | 606 MPa |
| Flexural modulus RT | 1906 MPa |
| (ASTM-D 790-71) 120° C. | 962 MPa |
| sag test (1 h/160° C.) 150 mm overhang | 19 mm |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an elastomeric molded article based on a polyurethane or polyurea and having a density of about 0.8 to 1.4 g/cm³ which comprises reacting at an isocyanate index of about 70 to 130 inside a closed mold as a one-shot system by the reaction injection molding process, a reaction mixture comprising
    (a) a polyisocyanate component comprising at least one di- or polyisocyanate having exclusively aromatically bound isocyanate groups,
    (b) an isocyanate reactive component comprising
        (1) a compound having a molecular weight of about 1800 to 12,000 and containing at least two isocyanate reactive groups,
        (2) optionally a diamine having a molecular weight of 108 to about 400 and containing two primary and/or secondary, aromatically bound amino groups and
        (3) a reaction product of
            (i) at least one polyepoxide having an epoxide equivalent weight of 76 to about 550 and containing at least two epoxide groups with
            (ii) said diamine in an amount of at least one mol of said diamine per epoxide group
wherein component (3i) is used in a quantity sufficient to provide about 0.5 to 25% by weight of said polyepoxide, based on the weight of component (b).

2. The process of claim 1 wherein component (b1) comprises a polyether polyol containing 2 to 3 alcoholic hydroxyl groups wherein at least 50% of said alcoholic hydroxyl groups are primary hydroxyl groups.

3. The process of claim 1 wherein component (b2) is present and comprises an aromatic diamine having an alkyl substituent in at least one ortho position to the amino groups.

4. The process of claim 1 wherein said diamine comprises 1-methyl-3,5-diethyl-2,4-diaminobenzene and optionally 1-methyl-3,5-diethyl-2,6-diaminobenzene.

5. The process of claim 1 wherein said diamine, including the portion of said diamine in component (b3) is present in an amount of about 5 to 50% by weight, based on the total weight of component (b).

6. The process of claim 1 wherein component (b) comprises an internal mold release agent comprising a zinc salt of an aliphatic monocarboxylic acid containing 8 to 24 carbon atoms in combination with an aliphatic polyamine containing primary, secondary and/or tertiary amino groups, said polyamine imparting solubility to said zinc salt in the presence of component (b).

7. The process of claim 1 wherein said reaction mixture additionally contains glass fibers.

8. The process of claim 1 wherein about 80 to 100 equivalent percent of the isocyanate reactive groups of component (b1) are primary and/or secondary amino groups.

9. The process of claim 8 wherein component (b) comprises about 5 to 50% by weight, based on the total weight of component (b), of said diamine, including said diamine of component (3i), said diamine having an alkyl substituent in at least one ortho position to the amino groups.

10. The process of claim 9 wherein said diamine comprises 1-methyl-3,5-diethyl-2,4-diaminobenzene and optionally 1-methyl-3,5-diethyl-2,6-diaminobensene.

11. The process of claim 10 wherein component (b) additionally comprises a mold release agent comprising a zinc salt of an aliphatic monocarboxylic acid containing 8 to 24 carbon atoms in combination with an aliphatic polyamine containing primary, secondary and/or tertiary amino groups, said polyamine imparting solubility to said zinc salt in the presence of component (b).

12. An isocyanate reactive component suitable for use in the reaction injection molding process which comprises
 (1) a compound having a molecular weight of about 1800 to 12,000 and containing at least two isocyanate reactive groups,
 (2) optionally, a diamine having a molecular weight of 108 to about 400 and containing two primary and/or secondary aromatically bound amino groups and
 (3) a reaction product of
  (i) at least one polyepoxide having an epoxide equivalent weight of 76 to about 550 and containing at least two epoxide groups with
  (ii) said diamine in a quantity of at least one mol of said diamine per epoxide group of component (i)
 wherein component (3i) is present in an amount sufficient to provide about 0.5 to 25% by weight of said polyepoxide, based on the weight of said isocyanate reactive component.

13. The isocyanate reactive component of claim 12 wherein about 80 to 100 equivalent percent of the isocyanate reactive groups of component (1) are primary and/or secondary amino groups.

14. The isocyanate reactive component of claim 13 which comprises about 5 to 50% by weight, based on the total weight of said isocyanate reactive component, of said diamine, including said diamine of component (3i), said diamine having an alkyl substituent in at least one ortho position to the amino groups.

15. The isocyanate reactive component of claim 14 wherein said diamine comprises 1-methyl-3,5-diethyl-2,4-diaminobenzene and optionally 1-methyl-3,5-diethyl-2,6-diaminobenzene.

16. The isocyanate reactive component of claim 15 which additionally comprises a mold release agent comprising a zinc salt of a aliphatic monocarboxylic acid containing 8 to 24 carbon atoms in combination with an aliphatic polyamine containing primary, secondary and/or tertiary amino groups, said polyamine imparting solubility to said zinc salt in the presence of said isocyanate reactive component.

17. The molded article obtained according to claim 1.
18. The molded article obtained according to claim 8.
19. The molded article obtained according to claim 9.
20. The molded article obtained according to claim 10.
21. The molded article obtained according to claim 11.

* * * * *